United States Patent

Nagatsuka et al.

[11] Patent Number: 5,922,426
[45] Date of Patent: Jul. 13, 1999

[54] PAPER FEED ROLL, PROCESS FOR THE PREPARATION THEREOF AND SILICONE RUBBER COMPOSITION FOR PAPER FEED ROLL

[75] Inventors: Eiichi Nagatsuka; Shinichi Ogawa, both of Ebina; Shigeo Kawachi, Yao; Tooru Kataoka, Yao; Masaru Kamei, Yao; Shinichi Sumimura; Kazuo Higuchi, both of Ichihara, all of Japan

[73] Assignees: Fuji Xerox Co., Ltd.; Kinjo Rubber Co., Ltd., both of Tokyo, Japan; Dow Corning Toray Silicone Co., Ltd., Osaka, Japan

[21] Appl. No.: 08/857,480

[22] Filed: May 16, 1997

Related U.S. Application Data

[63] Continuation of application No. 08/529,992, Sep. 19, 1995, abandoned.

[30] Foreign Application Priority Data

Sep. 19, 1994 [JP] Japan .................................. 6-223655

[51] Int. Cl.⁶ .................................. C08J 3/24; B29D 23/00
[52] U.S. Cl. .................. 428/36.92; 524/588; 524/493; 428/447; 523/212; 427/387; 492/56
[58] Field of Search ..................... 524/588, 493; 428/447, 36.92; 523/212; 427/387; 492/56

[56] References Cited

U.S. PATENT DOCUMENTS

| | | | |
|---|---|---|---|
| 3,677,981 | 7/1972 | Wada et al. | 525/478 |
| 4,043,977 | 8/1977 | DeMontigny et al. | 260/46.5 UA |
| 4,335,035 | 6/1982 | Hatanaka et al. | 523/212 |
| 4,374,212 | 2/1983 | Martellock et al. | 523/212 |
| 4,749,824 | 6/1988 | Orbeck | 174/179 |
| 5,120,385 | 6/1992 | Takahashi et al. | 156/244 |
| 5,132,340 | 7/1992 | Evans et al. | 523/209 |
| 5,455,313 | 10/1995 | Kurusu et al. | 525/478 |
| 5,582,885 | 12/1996 | Nakamura et al. | 428/35.8 |

FOREIGN PATENT DOCUMENTS

| | | |
|---|---|---|
| 60-130648 | 7/1985 | Japan . |
| 1-159239 | 6/1989 | Japan . |
| 4-298426 | 10/1992 | Japan . |
| 5-116778 | 5/1993 | Japan . |

*Primary Examiner*—Margaret W. Glass
*Attorney, Agent, or Firm*—Oliff & Berridge, PLC

[57] ABSTRACT

The present invention provides a paper feed roll adapted for office machines which exhibits a high friction coefficient suitable for the conveyance of copying paper, printing paper, original, etc. and less abrasion. A process for the preparation of such a paper feed roll is also provided. Further, a silicone rubber composition suitable for the foregoing paper feed roll having an excellent formability to roll is provided. In particular, a novel silicone rubber-coated paper feed roll is provided, which is prepared from a silica-containing silicone rubber composition. The silicone rubber obtained by curing the silica-containing silicone rubber composition and composes the paper feed roll has an impact resilience of not less than 80% after curing as determined by JIS K6301, a permanent compression set of not more than 4% under a condition of 25% compression at 70° C. for 22 hours and a 100% modulus of from 0.3 to 1.0 MPa. A novel silica-containing silicone rubber composition for use in a paper feed roll is also provided, which contains a diorganosiloxane represented by the following general formula as a silica treatment:

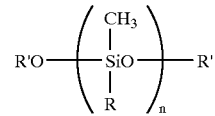

3 Claims, 1 Drawing Sheet

PAPER FEED ROLL, PROCESS FOR THE PREPARATION THEREOF AND SILICONE RUBBER COMPOSITION FOR PAPER FEED ROLL

This is a Continuation of application Ser. No. 08/529,992 filed Sep. 19, 1995, now abandoned.

FIELD OF THE INVENTION

The present invention relates to a paper feed roll for use in office machines such as copying machine, facsimile and printer and more particularly to a paper feed roll having a high friction coefficient and a reduced wear, suitable for the conveyance of copying paper, printing paper, original, etc.

The present invention also relates to a silicone rubber composition which exhibits after curing suitable physical properties for paper feed roll and a good formability to roll. The present invention further relates to a process for the preparation of the foregoing paper feed roll.

BACKGROUND OF THE INVENTION

Apparatus such as facsimile, printer and electrophotographic copying machine require a paper feed roll for conveying paper. The conventional paper feed rolls are made of a synthetic rubber such as EPDM, urethane and polynorbornene. However, the paper feed rolls made of such a synthetic rubber leave something to be desired in fuser oil resistance, light resistance and heat resistance.

In order to eliminate these disadvantages, various studies have been made. For example, a hardened silicone rubber composition comprising organopolysiloxane containing vinyl groups, resinous organopolysiloxane containing vinyl groups, organohydrogen polysiloxane, platinum or platinum compound and antistatic properties donor (see JP-A-60-130648 (The term "JP-A" as used herein means an "unexamined published Japanese patent application")), a silicone rubber roll made of an amorphous silicone rubber powder obtained by grinding silicone rubber (refer to JP-A-1-159239), an automatic paper feed rubber roller blended with diphenylsilane diol (refer to JP-A-4-298426), a paper feed rubber member obtained by the formation of a silicone rubber having a tear strength of not more than 15 kgf/cm (refer to JP-A-5-116778), etc. have been proposed.

If synthetic rubbers other than silicone rubber are used to prepare a paper feed roll, a problem arises that when a silicone oil is used for the purpose of releasing toner, the silicone oil gradually migrates to and accumulates on the rubber roll to cause a remarkable drop of friction coefficient. In order to solve the foregoing problem, a silicone rubber composition for use in the paper feed roll adapted for silicone oil as disclosed in the above cited patents has been proposed. However, such a silicone rubber composition cannot provide a high friction coefficient or is liable to a great wear after a prolonged operation of paper feed that causes a change in friction coefficient. Thus, there have been no satisfactory rolls.

SUMMARY OF THE INVENTION

It is therefore an object of the present invention to provide a paper feed roll which exhibits a high friction coefficient suitable for the conveyance of copying paper, printing paper, original, etc. and a reduced wear.

It is another object of the present invention to provide a silicone rubber composition which exhibits after curing optimum physical properties for paper feed roll and an excellent formability to roll.

It is a further object of the present invention to provide a process for the preparation of the foregoing paper feed roll.

These and other objects of the present invention will become more apparent from the following detailed description and examples.

The foregoing objects of the present invention are accomplished by the following constitutions:

1. A paper feed roll having a silicone rubber coating layer comprising a silica-containing silicone rubber having an impact resilience of not less than 80% as determined by JIS K6301, a permanent compression set of not more than 4% under a condition of 25% compression at 70° C. for 22 hours and a 100% modulus of from 0.3 to 1.0 MPa.

2. A silica-containing silicone rubber being obtained by curing a composition which comprises diorganopolysiloxane gum, silica and diorganosiloxane represented by the following general formula (I) as a silica treating agent and exhibiting an impact resilience of not less than 80% as determined by JIS K6301, a permanent compression set of not more than 4% under a condition of 25% compression at 70° C. for 22 hours and a 100% modulus of from 0.3 to 1.0 MPa:

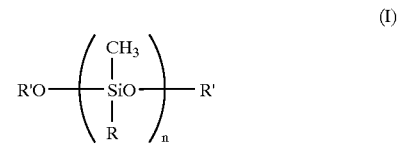

wherein R represents a substituted or unsubstituted monovalent hydrocarbon group; R' represents a hydrogen atom or $C_{1-8}$ alkyl group; and n represents an integer of from 1 to 50.

3. A silicone rubber composition comprising:
   (A) 100 parts by weight of a diorganopolysiloxane gum consisting of
      (1) from 50 to 99 parts by weight of a diorganopolysiloxane gum having vinyl groups at both ends and at side chains in an amount of from not less than 0.15 mol % to less than 0.8 mol % in all organic groups and the plasticity of the rubber is not less than 1.0 mm as determined by JIS C2123 and
      (2) from 1 to 50 parts by weight of a diorganopolysiloxane gum having vinyl groups at both ends and at side chains in an amount of from 0.8 to 10 mol % in all organic groups and the plasticity of the rubber is not less than 1.0 mm as determined by JIS C2123;
   wherein the vinyl group content in all organic groups in the mixture of the foregoing components (1) and (2) is not less than 0.2 mol %;
   (B) from 3 to 30 parts by weight of a reinforcing silica having a specific surface area of not less than 100 m²/g;
   (C) from 0.1 to 10 parts by weight of a diorganosiloxane represented by the following general formula (I):

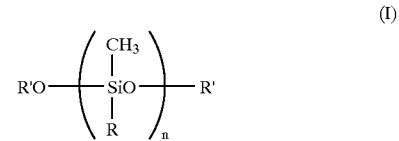

wherein R, R' and n are as defined above; and
   (D) a curing agent in an amount sufficient to cure said composition.

4. A process for the preparation of a paper feed roll comprising coating a roll core metal with a silica-containing silicone rubber composition which comprises diorganopolysiloxane, silica and diorganosiloxane represented by the following general formula (I) as a silica treating agent so that a silica-containing silicone rubber obtained by curing the silica-containing silicone rubber composition exhibits an impact resilience of not less than 80% as determined by JIS K6301, a permanent compression set of not more than 4% under a condition of 25% compression at 70° C. for 22 hours and a 100% modulus of from 0.3 to 1.0 MPa, subjecting the material to primary curing at a forming temperature of from 150° C. to 200° C. for from 2 to 15 minutes, and then subjecting the material to secondary curing at a forming temperature of from 150° C. to 250° C. for from 0.5 to 24 hours:

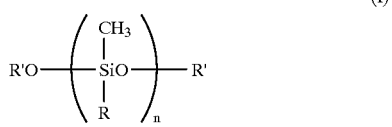

(I)

wherein R represents a substituted or unsubstituted monovalent hydrocarbon group; R' represents a hydrogen atom or $C_{1-8}$ alkyl group; and n represents an integer of from 1 to 50.

The inventors made extensive studies to solve the foregoing problems. As a result, the inventors succeeded in providing a paper feed roll having a high friction coefficient suitable for the conveyance of copying paper, printing paper, original, etc. and a reduced wear, a silicone rubber composition optimum for paper feed roll having an excellent formability to roll and a process for the preparation of the foregoing paper feed roll.

BRIEF DESCRIPTION OF THE DRAWING

By way of example and to make the description more clear, reference is made to the accompanying drawing in which.

DETAILED DESCRIPTION OF THE INVENTION

Figure 1:
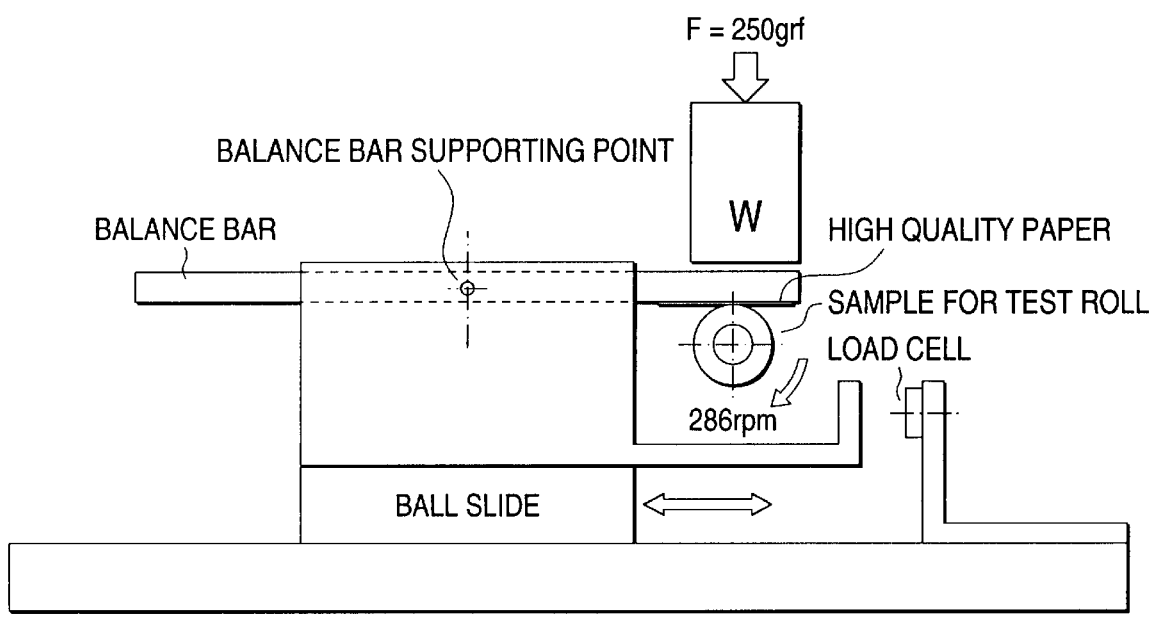
FIG. 1 illustrates a method for the measurement of friction coefficient.

The present invention will be further described hereinafter.

The impact resilience of the silicone rubber for coating the paper feed roll of the present invention is determined by subjecting the silicone rubber composition in cured form to measurement in accordance with JIS K6301. The optimum impact resilience of the silicone rubber of the present invention is not less than 80%, preferably not less than 82%, more preferably not less than 84%. When the impact resilience of the silicone rubber is not less than 80%, the silicone rubber can well follow the unevenness on the surface of paper, providing a rubber material which exhibits a higher degree of motion and no transfer loss. Thus, a paper feed roll having an excellent friction coefficient can be provided. At the same time, the rubber material can skip the unevenness on the surface of paper or slide on the paper less frequently, providing an enhanced abrasion resistance. If the impact resilience of the rubber material falls below 80%, the rubber material cannot have sufficient friction coefficient and abrasion resistance for paper feed roll.

When the permanent compression set of the silicone rubber for coating the paper feed roll of the present invention is not more than 4%, preferably not more than 3%, more preferably not more than 2% after 22 hours of retention of 25% compression at 70° C., a rubber material which can be well restored and less deformed after deformation under external force can be provided. Thus, a paper feed roll having an excellent friction coefficient can be provided. At the same time, fixed position development due to nip deformation can be prevented, reducing partial abrasion. When the permanent compression set of the silicone rubber of the present invention exceeds 4%, the rubber material cannot have sufficient friction coefficient and abrasion resistance for paper feed roll.

When the 100% modulus of the silicone rubber for coating the paper feed roll of the present invention is from 0.3 to 1.0 MPa, preferably from 0.4 to 0.9 MPa, more preferably from 0.5 to 0.7 MPa, the silicone rubber can be quickly restored after deformation, providing a good friction coefficient. Further, when the 100% modulus of the silicone rubber of the present invention is not more than 1.0 MPa, the silicone rubber can have a proper close contact to the paper surface, providing an enhanced abrasion resistance. When the 100% modulus of the silicone rubber of the present invention falls below 0.3 MPa, the silicone rubber is slowly restored after deformation, making it impossible to obtain a good friction coefficient. When the 100% modulus of the silicone rubber of the present invention exceeds 1.0 MPa, the silicone rubber comes into contact with too small area on the paper surface, providing a reduced abrasion resistance.

Most important among the starting materials constituting the silicone rubber composition for use in the paper feed roll of the present invention is the component (C), diorganosiloxane, as a silica-treating agent, which is represented by the following general formula (I). The diorganosiloxane is a component necessary for the enhancement of the impact resilience of the silicone rubber.

In the present invention, the processing with a silica-treating agent is not specifically limited. For example, the surface of silica may be previously treated. Alternatively, the silica surface-treating agent may be added when the other components are compounded.

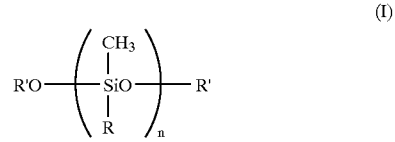

(I)

wherein R represents a substituted or unsubstituted monovalent hydrocarbon group; R' represents a hydrogen atom or $C_{1-8}$ alkyl group; and n represents an integer of from 1 to 50.

In the silica-treating agent of the present invention, it is preferred that 50 mol % or more, preferably 70 mol % or more, more preferably 90 mol % or more of organic groups connected to silicon atom in the molecule be a methyl group.

Examples of the group represented by R, which is connected to silicon atom include alkyl group such as methyl, ethyl, propyl, butyl and pentyl; alkenyl group such as vinyl; aryl group such as phenyl, tollyl and xylyl; aralkyl group such as benzyl and phenethyl; and a substituted hydrocarbon group with a chlorine atom or fluorine atom such as 3,3,3-trifluoropropyl, 3-chloropropyl and 2-cyanoethyl. These organic groups may contain an unsaturated hydrocarbon group such as an alkenyl group. Of them, methyl group and vinyl group are more preferred and methyl group is most preferred. If these organic groups contain the alkenyl group such as vinyl, its content is preferably not more than 10 mol % of all the organic groups.

Examples of the group represented by R' in the formula (I) include a hydrogen atom and a straight chain or branched alkyl group having from 1 to 8 carbon atoms such as methyl, ethyl and propyl.

Specific examples of diorganosiloxane employable as a silica-treating agent herein include dimethylsiloxane oligomer terminated by methoxy group at both ends of molecular chain, methylvinylsiloxane-methylphenylsiloxane copolymer oligomer terminated by methoxy group at both ends of molecular chain, dimethylsiloxane-methylvinyl siloxane-methylphenylsiloxane copolymer oligomer terminated by methoxy group at both ends of molecular chain, dimethyl siloxane-methyl vinyl siloxane-methyl(3,3,3-trifluoropropyl) siloxane copolymer oligomer terminated by methoxy group at both ends of molecular chain, dimethyl siloxane oligomer terminated by silanol group at both ends of molecular chain, methyl vinyl siloxane oligomer terminated by silanol group at both ends of molecular chain, dimethyl siloxane-methyl vinyl siloxane copolymer oligomer terminated by silanol group at both ends of molecular chain, methyl vinyl siloxanemethyl(3,3,3-trifluoropropyl) siloxane copolymer oligomer terminated by silanol group at both ends of molecular chain, and dimethyl siloxane-methyl vinyl siloxane-methyl phenyl siloxane copolymer oligomer terminated by silanol group at both ends of molecular chain.

Particularly preferred among these diorganosiloxanes are dimethylpolysiloxane oligomer terminated by silanol group at both ends of molecular chains and dimethyl siloxane oligomer terminated by methoxy group at both ends of molecular chain.

The foregoing diorganosiloxane is an important component for providing the cured rubber with an impact resilience of not less than 80%. The diorganosiloxane is preferably free of any organic group which causes a drop in the impact resilience, such as phenyl group and 3,3,3-trifluoropropyl group. If a phenyl group is incorporated in the diorganosiloxane for the purpose of enhancing the heat resistance thereof or a 3,3,3-trifluoropropyl group is incorporated in the diorganosiloxane for the purpose of enhancing the oil resistance thereof, its content preferably is not more than 10 mol %.

The amount of the silica-treating agent (C) to be incorporated in the silicone rubber composition is from 0.1 to 10 parts by weight, preferably from 0.5 to 7 parts by weight, more preferably from 2 to 5 parts by weight based on 100 parts by weight of the diorganopolysiloxane gum (A). If the amount of the silica-treating agent (C) falls below 0.1 part by weight based on 100 parts by weight of the component (A), the resulting composition exhibits a reduced kneadability before curing. Further, the resulting silicone rubber is more liable to plasticization. On the contrary, if the amount of the silica-treating agent (C) exceeds 10 parts by weight, the resulting composition exhibits a reduced kneadability and moldability before curing.

Diorganopolysiloxane gum (or diorganosiloxane raw rubber) (A) is a main component of the silicone rubber composition of the present invention. The component (A) is a mixture of (1) from 50 to 99 parts by weight of a diorganopolysiloxane gum having vinyl groups at both ends and at side chains (with the proviso that the vinyl group content in all organic groups is from not less than 0.15 mol % to less than 0.8 mol % and the plasticity of the gum is not less than 1.0 mm as determined by JIS C2123) and (2) from 1 to 50 parts by weight of a diorganopolysiloxane gum having vinyl groups at both ends and at side chains (with the proviso that the vinyl group content in all organic groups is from 0.8 to 10 mol % and the plasticity of the gum is not less than 1.0 mm as determined by JIS C2123), wherein the vinyl group content in all organic groups in the mixture of the foregoing components (1) and (2) is not less than 0.2 mol %, preferably from 0.3 to 0.8 mol %, more preferably from 0.4 to 0.7 mol %.

The positions at which vinyl groups are connected to the diorganopolysiloxane gum (A) need to be at the end of molecular chains and at side chains of molecular chains. If the vinyl groups are connected to the diorganopolysiloxane gum (A) only at the end of molecular chains, a sufficient content of vinyl groups cannot be secured. If the vinyl groups are connected to the diorganopolysiloxane gum (A) only at side chains of molecular chains, it disadvantageously reduces the curing rate or deteriorates the formability of the composition.

Examples of organic groups to be connected to silicon atom in the diorganopolysiloxane gum (A) other than vinyl group include alkyl group such as methyl, ethyl, propyl, butyl and pentyl, aryl group such as phenyl, tollyl and xylyl, aralkyl group such as benzyl and phenethyl, and substituted monovalent hydrocarbon group such as 3,3,3-trifluoropropyl, 3-chloropropyl and 2-cyanoethyl. In particular, 50 mol % or more of organic groups connected to silicon atom in the molecule are preferably methyl groups.

The molecular structure of the diorganopolysiloxane gum (A) is a straight chain or a partially-branched straight chain. The component (A) is in the form of gum. The plasticity of the component (A) needs to be not less than 1.0 mm as determined by JIS C2123. If the plasticity of the component (A) falls below 1.0 mm, it reduces the kneadability of the composition. The component (A) may be a homopolymer, copolymer or mixture thereof.

Specific examples of units constituting the component (A) include monofunctional siloxane unit such as trimethylsiloxy group, dimethylhydroxysiloxy group, dimethylvinylsiloxy group, methylvinylhydroxysiloxy group, methylphenylvinylsiloxy group and dimethyl(3,3,3-trifluoropropyl) siloxy group, bifunctional siloxane unit such as dimethylsiloxane unit, methylvinylsiloxane unit, methylphenylsiloxane unit, phenylvinylsiloxane unit and methyl (3,3,3-trifluoropropyl)siloxane unit, and trifunctional siloxane unit such as methylsiloxane unit, vinylsiloxane unit and phenylsiloxane unit.

Typical examples of the component (A) include an organopolysiloxane gum comprising a main chain made of bifunctional siloxane units and having monofunctional siloxane units at the end of molecular chain and an organopolysiloxane gum comprising a main chain made of a large amount of bifunctional siloxane units and a small amount of trifunctional siloxane units and monofunctional siloxane units at the end of molecular chain.

Specific examples of the component (A) include dimethylpolysiloxane gum terminated by dimethylvinylsiloxy group at both ends of molecular chain, methylvinylpolysiloxane gum terminated by dimethylvinylsiloxy group at both ends of molecular chain, dimethylsiloxane-methylvinylsiloxane copolymer gum terminated by dimethylvinylsiloxy group at both ends of molecular chain, dimethylsiloxane-methylphenylsiloxane copolymer gum terminated by dimethylvinylsiloxy group at both ends of molecular chain, methylvinylsiloxane-diphenylsiloxane copolymer gum terminated by dimethylvinylsiloxy group at both ends of molecular chain, dimethylsiloxane-methyl(3,3,3-trifluoropropyl)siloxane copolymer gum terminated by dimethylvinylsiloxy group at both ends of molecular chain, dimethylsiloxane-methylvinylsiloxane-methylphenylsiloxane copolymer gum terminated by dimethylvinylsiloxy group at both ends of molecular chain, dimethylsiloxanemethylvinylsiloxane-diphenylsiloxane copolymer gum terminated by dimethylvinylsiloxy group at both ends of molecular chain, dimethylpolysiloxane gum terminated by methyldivinylsiloxy group at both ends of molecular chain, methylvinylpolysiloxane gum terminated by methyldivinylsiloxy group at both ends of molecular chain, dimethylsiloxanemethylvinylsiloxane copolymer gum terminated by methyldivinylsiloxy group at both ends of molecular chain, dimethylsiloxane-methylphenylsiloxane copolymer gum terminated by methyldivinylsiloxy group at both ends of molecular chain, methylvinylsiloxane-diphenylsiloxane copolymer gum terminated by methyldivinylsiloxy group at both ends of molecular chain, dimethylsiloxane-methyl(3,3,3-trifluoropropyl)siloxane copolymer gum terminated by methyldivinylsiloxy group at both ends of molecular chain, dimethylsiloxane-methylvinylsiloxane-methylphenylsiloxane copolymer gum terminated by methyldivinylsiloxy group at both ends of molecular chain, and dimethylsiloxanemethylvinylsiloxane-diphenylsiloxane copolymer gum terminated by methyldivinylsiloxy group at both ends of molecular chain.

The component (A) is preferably free of any organic group which causes a drop in the impact resilience of the composition, such as phenyl group and 3,3,3-trifluoropropyl group. If a phenyl group is incorporated in the component (A) for the purpose of enhancing the heat resistance thereof or a 3,3,3-trifluoropropyl group is incorporated in the component (A) for the purpose of enhancing the oil resistance thereof, its content needs to be not more than 10 mol %.

The silica used in the present invention preferably includes a reinforcing silica, especially fumed silica and wet-method silica. The fumed silica is more preferable.

The silica is a component for providing the cured silicone rubber with a mechanical strength and a sufficient abrasion resistance. Specific examples of such a silica component include Aerosil 200, Aerosil 300 (available from Nihon Aerosil Co., Ltd.), and Reolosil Q102 (available from Tokuyama Soda Co., Ltd.). The optimum grain diameter of the silica powder is not more than 50 mμ, preferably not more than 20 mμ. The optimum specific surface area of the silica powder is not less than 100 m$^2$/g, preferably not less than 150 m$^2$/g, more preferably not less than 200 m$^2$/g. If the specific surface area of the silica powder falls below 100 m$^2$/g, the resulting composition exhibits a reduced formability to roll.

The optimum amount of the silica powder component (B) to be incorporated in the silicone rubber composition of the present invention is from 3 to 30 parts by weight based on 100 parts by weight of the diorganopolysiloxane gum (A). If the amount of the component (B) to be incorporated in the silicone rubber composition falls below 3 parts by weight based on 100 parts by weight of the component (A), the resulting silicone rubber composition exhibits a reduced kneadability before curing. The silicone rubber composition thus cured exhibits a reduced mechanical strength and hence a deteriorated formability to roll. On the contrary, if the amount of the component (B) to be incorporated in the silicone rubber composition exceeds 30 parts by weight, the silicone rubber composition thus cured exhibits a reduced friction coefficient and is thus unsuitable for paper feed roll.

A curing agent (D) is a component for curing the composition of the present invention. As such a curing agent there may be used a compound commonly used as a silicone rubber composition curing agent such as conventional organic peroxide and mixture of organohydrogenpolysiloxane and platinum catalyst.

Examples of the organic peroxide to be used as the component (D) include benzoyl peroxide, t-butyl perbenzoate, 2,4-dichlorobenzoyl peroxide, monochlorobenzoyl peroxide, dicumyl peroxide, and 2,5-dimethyl-2,5-di(t-butylperoxy)hexane.

Specific examples of the mixture of organohydrogenpolysiloxane and platinum catalyst to be used as the component (D) include a mixture of organohydrogenpolysiloxane such as methylhydrogenpolysiloxane terminated by trimethylsiloxy group at both ends of molecular chain, dimethylsiloxane-methylhydrogensiloxane copolymer terminated by trimethylsiloxy group at both ends of molecular chain, dimethylpolysiloxane terminated by dimethylhydrogensiloxy group at both ends of molecular chain, dimethylsiloxane-methylhydrogensiloxane copolymer terminated by dimethylhydrogen siloxy group at both ends of molecular chain and methylphenylsiloxane-methylhydrogensiloxane copolymer terminated by trimethylsiloxy group at both ends of molecular chain, and platinum catalyst such as platinum black, chloroplatinic acid, complex of chloroplatinic acid with olefin, complex of chloroplatinic acid with alkenylsiloxane, alcohol solution of chloroplatinic acid, finely divided silica powder supported with platinum, activated carbon supported with platinum and particulate thermoplastic organic resin (e.g., polycarbonate resin, polymethylmethacrylate resin, polystyrene resin, silicone resin) containing such a platinum catalyst.

The amount of the component (D) to be incorporated in the silicone rubber composition of the present invention is not particularly limited as long as it is sufficient to cure the composition of the present invention. In some detail, the amount of the component (D), if it is an organic peroxide, to be incorporated in the silicone rubber composition of the present invention is preferably from 0.1 to 10 parts by weight based on 100 parts by weight of the component (A). The amount of organohydrogenpolysiloxane, when the component (D) is a mixture of organohydrogenpolysiloxane and platinum catalyst, to be incorporated in the silicone rubber composition of the present invention is preferably from 0.5 to 20 parts by weight based on 100 parts by weight of the component (A). The content of platinum in the platinum catalyst is preferably from 0.1 to 100 parts by weight based on 1,000,000 parts by weight of the component (A).

The silicone rubber composition of the present invention may be prepared by uniformly compounding the foregoing components (A) to (D). The procedure for the preparation of the composition of the present invention is not specifically limited. One of ordinary procedures comprises preparing a composition made of the foregoing components (A) to (C), and then incorporating the component (D) in the composition by means of a roll (commonly referred to as "caterizing").

The apparatus for the preparation of the composition made of the foregoing components (A) to (C) is not specifically limited. For example, Henschel mixer, Ross mixer, kneader mixer, twin-screw continuous kneader, etc. can be used. In order to prepare the composition of the present invention, various methods may be used, e.g., method which comprises kneading uniformly the component (A) with the components (B) and (C), followed by kneading with the component (D), in the foregoing kneader, and method which comprises kneading uniformly a part of the component (A) with the components (B) and (C), followed by kneading uniformly with the rest of the component (A) and the component (D), in the foregoing kneader.

The silicone rubber composition of the present invention is made of the foregoing components (A) to (D) as mentioned above. The silicone rubber composition of the present invention may contain a pigment such as titanium oxide, carbon black and red oxide, a heat-resisting agent such as oxide of rare earth elements, hydroxide of rare earth elements, magnesium oxide, cerium silanolate and aliphatic salt of cerium, an antistatic agent, fire retardant, internal releasing agent, and other various additives incorporated therein as far as the objects of the present invention are not impaired.

In the case where a mixture of organohydrogenpolysiloxane and platinum catalyst is used as the component (D), a curing inhibitor such as benzotriazole, acetylene compound and hydroperoxide compound may be incorporated in the composition of the present invention to control the pot life thereof.

The process for the formation of the silicone rubber composition of the present invention to a paper feed roll consists of a primary curing step which comprises coating a roll core metal with the silicone rubber composition by means of a known rubber forming machine such as compression molding machine, injection molding machine and transfer molding machine, and then curing the silicone rubber composition at a molding temperature of from 150° C. to 220° C., preferably from 165° C. to 200° C., more preferably from 170° C. to 180° C. for from 2 to 15 minutes, preferably from 5 to 14 minutes, more preferably from 8 to 13 minutes, and a secondary curing step which comprises curing the material in an oven with internal air circulation or the like at a curing temperature of from 150° C. to 250° C., preferably from 170° C. to 220° C., more preferably from 180° C. to 210° C., for from 0.5 to 24 hours, preferably from 1 to 12 hours, more preferably from 2 to 6 hours.

In the primary curing step, if the molding temperature falls below 150° C. and the molding time falls below 2 minutes, curing cannot thoroughly proceed, making it impossible to obtain a rubber material having an impact resilience of not less than 80%. On the contrary, if the molding temperature exceeds 220° C., the resulting product is brittle and thus liable to cutout. Thus, a defective product is provided. If the molding time exceeds 15 minutes, energy is wasted and cost is raised, reducing the productivity.

The secondary curing step is needed to obtain a desired permanent compression set. In the secondary curing step, if the secondary curing temperature falls below 150° C. and the secondary curing time falls below 0.5 hours, it is made impossible to obtain a permanent compression set of not more than 4%. If the secondary curing temperature exceeds 250° C., energy is wasted and the rubber material is liable to heat deterioration. If the secondary curing time exceeds 24 hours, energy is wasted and cost is raised, reducing the productivity.

The composition which has thus been formed into roll may be then subjected to abrasion finishing to prepare a paper feed roll. Alternatively, the composition of the present invention may be applied to the surface of a conventional paper feed roll, followed by curing, to produce a paper feed roll.

The optimum thickness of the silicone rubber layer on the paper feed roll is from 1 to 20 mm. If the thickness of the silicone rubber layer thus formed falls below 1 mm, the effect of the core metal can easily be transferred to the paper surface, reducing the conveying capacity thereof and the abrasion resistance thereof. If the thickness of the silicone rubber layer thus formed exceeds 20 mm, the internal curing is delayed during the primary curing step, making it difficult to obtain a permanent compression set of not more than 4%. The thickness of the silicone rubber layer thus formed is preferably from 2 to 15 mm, more preferably from 3 to 10 mm.

The present invention will be further described in the following examples, but the present invention should not be construed as being limited thereto.

In the following examples, the plasticity is as determined by the method according to JIS C2123 at 25° C. The viscosity is as determined at 25° C.

For the measurement of friction coefficient, a cylindrical roll having a width of 10 mm, an inner diameter of 10 mm and an external diameter of 20 mm was formed. As shown in FIG. 1, a high quality paper was put on the lower surface of a balance bar. The balance bar was then put on the cylindrical roll mounted on a shaft. The roll was rotated at 286 r.p.m. in the direction of the arrow with a load of 250 grf on the balance bar. The friction coefficient was then measured from the conveying force applied to a load cell.

For the measurement of abrasion resistance, the cylindrical roll was rotated at 250 r.p.m. for 2,000 revolutions on a fixed high quality paper under a load of 180 grf. The high quality paper was then renewed. The cylindrical roll was then rotated at the same speed for 4,000 revolutions. The weight loss was determined after 2,000 revolutions and after 6,000 revolutions. The physical properties of the silicone rubber were measured by the method according to JIS K6301. The hardness of the silicone rubber was determined by Type A spring-loaded hardness test specified in JIS K6301.

The paper feed roll of the present invention is prepared by coating an iron roll core with a silicone rubber composition mainly composed of a diorganopolysiloxane gum and a fumed silica which exhibits physical properties as set forth in Table 1 after curing, and then heat-curing the material. As the roll core metal there may be used a metallic roll core made of iron, stainless steel or the like for use in ordinary paper feed rolls. The kind of the roll core and the material used for the roll core are not specifically limited.

The silicone rubber of the present invention needs to exhibit an impact resilience of not less than 80% after curing, a permanent compression set of not more than 4% developed after 24 hours of retention of 25% compression at 70° C. and a 100% modulus of from 0.3 to 1.0 MPa.

The foregoing silicone rubber-coated paper feed roll may be prepared by various methods. One of these methods comprises applying the silicone rubber composition to the roll core metal, and then heat curing the composition. In this case, the formation of the silicone rubber composition can be accomplished by compression molding, injection molding or like method. In another method, the silicone rubber composition may be previously formed into a tubular product. The roll core metal may be then inserted into the core of the tube.

EXAMPLES 1–3

Various silicone rubber compositions set forth in Table 1-(1) were pressed at a temperature of 170° C. for 10 minutes to form 2-mm thick silicone rubber sheets. There silicone rubber sheets were each allowed to stand in a 200° C. oven with internal air circulation for 4 hours. These silicone rubber sheets thus treated were then measured for physical properties.

The sample roll shown in FIG. 1 was pressed in a mold at a molding temperature of 170° C. for 10 minutes, allowed to stand in a 200° C. oven with internal air circulation for 4 hours, and then polished to provide sample rolls of Examples 1 to 3. These samples were then measured for friction coefficient and abrasion by the foregoing testing methods. The results are set forth in Table 1.

As shown in Table 1, the samples of Examples 1 to 3 inhibited preferred physical properties according to the present invention, i.e., high friction coefficient and anexcellent abrasion resistance. All these examples exhibited impact resilience of not less than 80%, a permanent compression set of not more than 4% (70° C./22 hours, 25% compression) and a 100% modulus of from 0.3 MPa to 1.0 MPa.

TABLE 1-(1)

| Silicone Rubber Composition | Example 1 (parts) | Example 2 (parts) | Example 3 (parts) |
|---|---|---|---|
| Dimethylsiloxane methylvinylsiloxane compolymer gum Dimethyl group 99.6 mol % Vinyl group 0.4 mol % | 98 | 95 | 90 |
| Dimethyl siloxane methylvinylsiloxane copolymer gum Dimethyl group 98.5 mol % Vinyl group 1.5 mol % | 2 | 5 | 10 |
| Fumed Silica (Surface area 200 m²/g) | 10 | 20 | 20 |
| Silica-treating agent | 2 | 2 | 2 |

TABLE 1-(2)

| Properties evaluated | Unit | Example 1 | Example 2 | Example 3 | Comparative Example 1 | Comparative Example 2 | Comparative Example 3 |
|---|---|---|---|---|---|---|---|
| Hardness | | 22 | 31 | 40 | 24 | 35 | 41 |
| Tensile strength | MPa | 0.7 | 3.4 | 2.7 | 7.9 | 9.6 | 9.8 |
| Elongation | % | 290 | 340 | 220 | 930 | 1,090 | 830 |
| Tear strength | N/mm | 4 | 10 | 10 | 11 | 20 | 21 |
| Impact resilience | % | 85 | 85 | 85 | 65 | 45 | 51 |
| Permanent compression set | % | 1 | 0 | 1 | 5 | 8 | 4 |
| 100% modulus | MPa | 0.3 | 0.5 | 0.7 | 0.1 | 0.2 | 0.2 |
| Friction coefficient | | 1.73 | 1.91 | 1.84 | 1.31 | 1.28 | 1.27 |
| Abrasion after 2000 revolutions | mg | 0.6 | 0.7 | 0.6 | 1.2 | 1.4 | 1.5 |
| Abrasion after 6000 revolutions | mg | 1.0 | 1.1 | 0.9 | 2.5 | 4.6 | 3.8 |

COMPARATIVE EXAMPLES 1–3

Various silicone rubber materials set forth in Table 1 were processed in the same manner as in Example 1 to prepare sheets and sample rolls. These sheets were each then measured for various physical properties in the same manner as in Example 1. These sample rolls were each then measured for friction coefficient and abrasion in the same manner as in Example 1. The results are set forth in Table 1.

As shown in Table 1, all the samples of Comparative Examples 1 to 3 deviate from the ranges specified herein in impact resilience, permanent compression set and 100% modulus except that the permanent compression set of Comparative Example 3 was 4%, which is the upper limit of the range specified herein. It can thus been seen that all the samples of Comparative Examples 1 to 3 exhibit a low friction coefficient and a poor abrasion resistance.

EXAMPLE 4

Into a kneader mixer were charged 100 parts by weight of a diorganopolysiloxane gum consisting of 95 parts by weight of a dimethylsiloxane-methyl vinyl siloxane copolymer gum terminated by dimethyl vinyl group at both ends of molecular chain containing 99.5 mol % of dimethyl group and 0.5 mol % of vinyl group (plasticity of 1.33 mm as determined by JIS C2123) and 55 parts by weight of a dimethyl siloxanemethyl vinyl siloxane copolymer gum terminated by methyl divinyl group at both ends of molecular chain containing 98.5 mol % of dimethyl group and 1.5 mol % of vinyl group (plasticity of 1.43 mm as determined by JIS C2123), 13.3 parts by weight of a fumed silica having a specific surface area of 200 m²/g, and 2 parts by weight of a dimethyl polysiloxane terminated by silanol group at both ends having a viscosity of 30 cP as a silica surface treating agent. These materials were then uniformly kneaded.

The mixture thus obtained was then subjected to heat treatment at a temperature of 170° C. for 2 hours. To 100 parts by weight of the silicone rubber base thus obtained was then added 1 part by weight of 2,5-dimethyl-bis(2,5-t-butylperoxy)hexane. The mixture was then uniformly mixed by means of a two-roll mill to prepare a silicone rubber composition for paper feed roll of Example 4. The silicone rubber composition for paper feed roll thus prepared was evaluated in the same manner as in Example 1. The results are set forth in Table 2.

TABLE 2

| Silicone rubber composition | Example 4 | Comparative Example 4 | Comparative Example 5 |
|---|---|---|---|
| Dimethylsiloxane-methylvinyl siloxane copolymer gum Dimethyl group: 99.5 mol % Vinyl group: 0.5 mol % | 95 parts | | |
| Dimethylsiloxane-methylvinyl siloxane copolymer gum Dimethyl group: 98.5 mol % Vinyl group: 1.5 mol % | 5 parts | | |
| Dimethylsiloxane-methylvinyl siloxane copolymer gum Dimethyl group: 99.9 mol % Vinyl group: 0.1 mol % | | 100 parts | 100 parts |
| Fumed silica (surface area: 200 m²/g) | 20 parts | 20 parts | 35 parts |
| Silica surface treating agents | 3 parts | 3 parts | 3 parts |
| Hardness | 33 | 20 | 35 |
| Tensile strength MPa | 2.7 | 3.8 | 6.5 |
| Elongation % | 260 | 420 | 320 |
| Tear strength N/mm | 8 | 11 | 15 |
| Impact resilience % | 85 | 75 | 65 |
| Permanent compression set % | 1 | 5 | 6 |
| 100% modulus MPa | 0.7 | 0.2 | 1.1 |

TABLE 2-continued

| Silicone rubber composition | Example 4 | Comparative Example 4 | Comparative Example 5 |
|---|---|---|---|
| Friction coefficient | 1.71 | 1.33 | 1.25 |
| Abrasion after 2000 revolutions mg | 0.7 | 2.0 | 2.4 |
| Abrasion after 6000 revolutions mg | 1.1 | 2.9 | 3.3 |

COMPARATIVE EXAMPLE 4

A silicone rubber composition was prepared in the same manner as in Example 4 except that 100 parts by weight of a dimethysiloxane-methylvinylsiloxane copolymer raw rubber terminated by dimethylvinyl group at both ends of molecular chain containing 99.9 mol % of dimethyl group and 0.1 mol % of vinyl group (plasticity of 1.43 mm as determined by JIS C2123) were used. The silicone rubber composition thus prepared was then evaluated in the same manner as in Example 1. The results are set forth in Table 2.

COMPARATIVE EXAMPLE 5

A silicone rubber composition was prepared in the same manner as in Example 4 except that 100 parts by weight of a dimethysiloxane-methyl vinyl siloxane copolymer raw gum terminated by dimethylvinyl group at both ends of molecular chain containing 99.9 mol % of dimethyl group and 0.1 mol % of vinyl group (plasticity of 1.43 mm as determined by JIS C2123) were used and 35 parts by weight of a fumed silica were compounded. The silicone rubber composition thus prepared was then evaluated in the same manner as in Example 1. The results are set forth in Table 2.

Evaluation

As can be seen in Table 2, Example 4 falls within a preferred range of impact resilience, permanent compression set and 100% modulus according to the present invention. On the contrary, Comparative Examples 4 and 5 deviate from the above defined range. Example 4 exhibits a high friction coefficient and an excellent abrasion resistance. However, Comparative Examples 4 and 5 are also poor in these properties.

EXAMPLE 5

Into a kneader mixer were charged 90 parts by weight of a dimethylsiloxane-methylvinylsiloxane copolymer gum terminated by dimethylvinyl group at both ends of molecular chain containing 99.8 mol % of dimethyl group and 0.2 mol % of vinyl group (plasticity of 1.65 mm as determined by JIS C2123), 10 parts by weight of a dimethyl siloxane-methylvinylsiloxane copolymer raw rubber terminated by dimethylvinyl group at both ends of molecular chain containing 96 mol % of dimethyl group and 4 mol % of vinyl group (plasticity of 1.22 mm as determined by JIS C2123), 10 parts by weight of a fumed silica having a specific surface area of 300 $m^2/g$, and 2 parts by weight of a dimethyl polysiloxane terminated by silanol group at both ends having a viscosity of 30 cP as a silica surface treatment. These materials were then uniformly kneaded. The mixture thus obtained was then subjected to heat treatment at a temperature of 150° C. for 1 hour. To 100 parts by weight of the silicone rubber base thus obtained was then added 1 part by weight of 2,5-dimethyl-bis(2,5-t-butylperoxy)hexane. The mixture was then uniformly mixed by means of a two-roll mill to prepare a silicone rubber composition for paper feed roll of Example 5. The silicone rubber composition for paper feed roll thus prepared was evaluated in the same manner as in Example 1. The results are set forth in Table 3.

TABLE 3

| Silicone rubber composition | Example 5 | Comparative Example 6 |
|---|---|---|
| Dimethylsiloxane-methylvinyl siloxane copolymer gum Dimethyl group: 99.8 mol % Vinyl group: 0.2 mol % | 90 parts | 90 parts |
| Dimethylsiloxane-methylvinyl siloxane copolymer gum Dimethyl group: 96.0 mol % Vinyl group: 4.0 mol % | 10 parts | 10 parts |
| Fumed silica (surface area: 300 $m^2/g$) | 10 parts | 10 parts |
| Silica surface treating agent | | |
| Dimethyl polysiloxane terminated by silanol at both ends | 2 parts | |
| Diphenylsilane diol | | 1 part |
| Hardness | 25 | 22 |
| Tensile strength MPa | 2.2 | 2.0 |
| Elongation % | 170 | 230 |
| Tear strength N/mm | 5 | 7 |
| Impact resilience % | 85 | 78 |
| Permanent compression set % | 2 | 5 |
| 100% modulus MPa | 0.5 | 0.2 |
| Friction coefficient | 1.75 | 1.05 |
| Abrasion after 2000 revolutions mg | 0.5 | 2.8 |
| Abrasion after 6000 revolutions mg | 0.9 | 3.4 |

COMPARATIVE EXAMPLE 6

A silicone rubber composition was prepared in the same manner as in Example 5 except that diphenylsilane diol was used as a silica treating agent in an amount of 1 part by weight. The silicone rubber composition thus prepared was then evaluated in the same manner as in Example 1. The results are set forth in Table 3.

Evaluation

As can be seen in Table 3, the silicone rubber of Example 5 falls within a preferred range of impact resilience, permanent compression set and 100% modulus according to the present invention. On the contrary, Comparative Example 6 deviates from the above defined range. Example 5 exhibits a high friction coefficient and an excellent abrasion resistance. However, Comparative Example 6 is also poor in these properties.

EXAMPLE 6

Into a kneader mixer were charged 90 parts by weight of a dimethylsiloxane-methylvinylsiloxane copolymer gum terminated by dimethylvinyl group at both ends of molecular chain containing 99.5 mol % of dimethyl group and 0.5 mol % of vinyl group (plasticity of 1.30 mm as determined by JIS C2123), 10 parts by weight of a dimethyl siloxane-methylvinylsiloxane copolymer gum terminated by dimethyl vinyl group at both ends of molecular chain containing 98.5 mol % of dimethyl group and 1.5 mol % of vinyl group (plasticity of 1.55 mm as determined by JIS C2123), 25 parts by weight of a fumed silica having a specific surface area of 300 m²/g, and 3 parts by weight of a dimethyl polysiloxane terminated by silanol group at both ends having a viscosity of 30 cP as a silica surface treating agent. These materials were then uniformly kneaded.

The mixture thus obtained was then subjected to heat treatment at a temperature of 170° C. for 2 hours. To 100 parts by weight of the silicone rubber base thus obtained was then added 1 part by weight of 2,5-dimethyl-bis(2,5-t-butylperoxy)hexane. The mixture was then uniformly mixed by means of a two-roll mill to prepare a silicone rubber composition for paper feed roll of Example 6. The silicone rubber composition for paper feed roll thus prepared was evaluated in the same manner as in Example 1. The results are set forth in Table 4.

TABLE 4

| Silicone rubber composition | Example 5 | Comparative Example 7 |
|---|---|---|
| Dimethylsiloxane-methylvinyl siloxane copolymer gum Dimethyl group: 99.5 mol % Vinyl group: 0.5 mol % | 90 parts | 90 parts |
| Dimethylsiloxane-methylvinyl siloxane copolymer gum Dimethyl group: 98.5 mol % Vinyl group: 1.5 mol % | 10 parts | 10 parts |
| Silica | | |
| Fumed silica (surface area: 300 m²/g) | 25 parts | |
| Wet-method silica | | 25 parts |
| Silica surface treating agent Dimethyl polysiloxane terminated by silanol at both ends | 3 parts | 3 parts |
| Hardness | 30 | 25 |
| Tensile strength MPa | 5.5 | 4.1 |
| Elongation % | 450 | 150 |
| Tear strength N/mm | 10 | 7 |
| Impact resilience % | 83 | 85 |
| Permanent compression set % | 3 | 3 |
| 100% modulus MPa | 0.7 | 1.1 |
| Friction coefficient | 1.71 | 1.55 |
| Abrasion after 2000 revolutions mg | 0.7 | 2.7 |
| Abrasion after 6000 revolutions mg | 1.1 | 6.3 |

COMPARATIVE EXAMPLE 7

A silicone rubber composition was prepared in the same manner as in Example 6 except that wet-method silica having a specific surface area of 200 m²/g was used as silica in an amount of 25 parts by weight. The silicone rubber composition thus prepared was then evaluated in the same manner as in Example 1. The results are set forth in Table 4.

Evaluation

As can be seen in Table 4, the silicone rubber of Example 6 falls within a preferred range of impact resilience, permanent compression set and 100% modulus according to the present invention. On the contrary, Comparative Example 7 deviates from the above defined range of 100% modulus, though falling within the above defined range of impact resilience and permanent compression set. Example 6 exhibits almost the same friction coefficient as Comparative Example 7 but exhibits a better abrasion resistance than Comparative Example 7.

EXAMPLES 7, 8

100 parts by weight of the same silicone rubber base as prepared in Example 6 were mixed with 1.0 part by weight of a dimethylsiloxane-methyl hydrogen siloxane copolymer having a viscosity of 10 cSt, a complex of chloroplatinic acid with divinyltetramethyldisiloxane in an amount such that the content of metallic platinum was 10 ppm, and 0.1 parts by weight of phenyl butynol. The mixture was then uniformly stirred by means of a two-roll mill to prepare silicone rubber compositions for paper feed roll of Examples 7 and 8. These silicone rubber compositions for paper feed roll were then molded in the same manner as in Example 1 except that the molding temperature was altered as set forth in Table 5 to obtain paper feed rolls of Examples 7 and 8. These paper feed rolls were evaluated in the same manner as in Example 1. The results are set forth in Table 5.

TABLE 5

| Silicone rubber composition | Example 7 | Comparative Example 8 | Comparative Example 9 |
|---|---|---|---|
| Dimethylsiloxane-methylvinyl siloxane copolymer gum Dimethyl group: 99.5 mol % Vinyl group: 0.5 mol % | 90 parts | 90 parts | 90 parts |
| Dimethylsiloxane-methylvinyl siloxane copolymer gum Dimethyl group: 98.5 mol % Vinyl group: 1.5 mol % | 10 parts | 10 parts | 10 parts |
| Fumed silica (surface area: 300 m²/g) | 25 parts | 25 parts | 25 parts |
| Silica surface treating agent Dimethylpolysiloxane terminated by silanol at both ends | 3 parts | 3 parts | 3 parts |
| Foregoing silicone rubber composition | 100 parts | 100 parts | 100 parts |
| RD-11 (platinum catalyst) | 1 part | 1 part | |
| RD-3 (SiH-containing curing agent) | 2 parts | 2 parts | |
| RC-2 (peroxide catalyst) | | | 1.5 parts |
| Molding temperature (°C.) | 170 | 150 | 120 |
| Hardness | 28 | 24 | 22 |
| Tensile strength MPa | 5.1 | 4.8 | 3.2 |
| Elongation % | 550 | 590 | 400 |
| Tear strength N/mm | 15 | 13 | 10 |
| Impact resilience % | 83 | 81 | 74 |
| Permanent compression set % | 3 | 4 | 6 |
| 100% modulus MPa | 0.4 | 0.3 | 0.6 |
| Friction coefficient | 1.74 | 1.70 | 1.33 |
| Abrasion after 2000 revolutions mg | 0.3 | 0.4 | 1.9 |
| Abrasion after 6000 revolutions mg | 0.8 | 1.0 | 3.8 |

COMPARATIVE EXAMPLE 8

To 100 parts by weight of the same silicone rubber base as prepared in Example 6 was added 1.5 parts by weight of a silicone oil paste containing 50% by weight of 2,4-dichlorobenzoyl peroxide. The mixture was then homogeneously mixed by a two-roll mill to prepare a silicone rubber composition for paper feed roll of Comparative Example 8. The silicone rubber composition thus prepared was then molded in the same manner as in Example 1 except that the molding temperature was 120° C. to obtain a paper feed roll of Comparative Example 8. The paper feed roll thus obtained was then evaluated in the same manner as in Example 1. The results are set forth in Table 5.

Evaluation

As can be seen in Table 5, the silicone rubber compositions of Examples 7 and 8, which have been cured in the presence of a platinum catalyst, fall within the range of impact resilience, permanent compression set and 100% modulus defined herein. On the contrary, the silicone rubber of Comparative Example 8 falls only within the range of 100% modulus defined herein but deviates from the range of impact resilience and permanent compression set defined herein. It can also be seen that the silicone rubber of Examples 7 and 8 are excellent in friction coefficient and abrasion resistance as compared with Comparative Example 8.

EXAMPLE 9, COMPARATIVE EXAMPLES 9–11

The same material as used in Example 4 was molded in the same manner as in Example 1 except that the primary hardening conditions were altered as set forth in Table 6 to obtain paper feed rolls of Example 9 and Comparative Examples 9 to 11. These paper feed rolls were then evaluated in the same manner as in Example 1. The results are set forth in Table 6 in contrast to that of Example 1.

Evaluation

It can thus been seen that the paper feed roll of Example 9 falls within the range of impact resilience, permanent compression set and 100% modulus defined herein and exhibits a high friction coefficient and an excellent abrasion resistance. On the other hand, the silicone rubber composition of Comparative Example 9, which has been subjected to primary hardening at a temperature as high as 225° C., falls within the range of impact resilience and permanent compression set defined herein but deviates from the range of 100% modulus defined herein and cannot provide a high friction coefficient. The silicone rubber composition of Comparative Example 10, which has been subjected to primary hardening at a temperature as low as 140° C., and silicone rubber composition of Comparative Example 11, which has been subjected to primary hardening for a period of time as short as 1.5 minutes, deviate from the preferred range of impact resilience, permanent compression set and 100% modulus defined herein and exhibit poor friction coefficient and abrasion resistance.

EXAMPLE 10, COMPARATIVE EXAMPLES 12–14

The same material as used in Example 4 was molded in the same manner as in Example 1 except that the secondary hardening conditions were altered as set forth in Table 7 to obtain paper feed rolls of Example 10 and Comparative Examples 12 to 14. These paper feed rolls were then evaluated in the same manner as in Example 1. The results are set forth in Table 7 in contrast to that of Example 4.

TABLE 6

| | Example 4 | Comparative Example 9 | Comparative Example 10 | Example 9 | Comparative Example 11 |
|---|---|---|---|---|---|
| Primary curing condition | | | | | |
| Temperature (°C.) | 170 | 225 | 140 | 170 | 170 |
| Time (min.) | 10 | 10 | 10 | 15 | 1.5 |
| Secondary curing condition | | | | | |
| Temperature (°C.) | 200 | 200 | 200 | 200 | 200 |
| Time (min.) | 4 | 4 | 4 | 4 | 4 |
| Hardness | 33 | 35 | 22 | 33 | 26 |
| Tensile strength MPa | 2.7 | 1.9 | 3.5 | 3.1 | 3.8 |
| Elongation % | 260 | 160 | 750 | 280 | 560 |
| Tear strength N/mm | 8 | 4 | 12 | 8 | 11 |
| Impact resilience % | 85 | 86 | 58 | 86 | 61 |
| Permanent compression set % | 1 | 1 | 9 | 1 | 7 |
| 100% modulus MPa | 0.7 | 1.1 | 0.2 | 0.9 | 0.2 |
| Friction coefficient | 1.71 | 1.32 | 1.21 | 1.73 | 1.32 |
| Abrasion after 2000 revolutions mg | 0.7 | 1.3 | 4.2 | 0.6 | 3.5 |
| Abrasion after 6000 revolutions mg | 1.1 | 2.2 | 7.3 | 1.0 | 6.1 |

TABLE 7

|  | Example 4 | Comparative Example 12 | Comparative Example 13 | Example 10 | Comparative Example 14 |
|---|---|---|---|---|---|
| Primary curing condition | | | | | |
| Temperature (°C.) | 170 | 170 | 170 | 170 | 170 |
| Time (min.) | 10 | 10 | 10 | 10 | 10 |
| Secondary curing condition | | | | | |
| Temperature (°C.) | 200 | 280 | 120 | 200 | 200 |
| Time (min.) | 4 | 4 | 4 | 24 | 0.25 |
| Hardness | 33 | 32 | 30 | 34 | 30 |
| Tensile strength MPa | 2.7 | 2.5 | 2.4 | 2.6 | 2.3 |
| Elongation % | 260 | 210 | 280 | 240 | 310 |
| Tear strength N/mm | 8 | 6 | 10 | 7 | 1.1 |
| Impact resilience % | 85 | 78 | 78 | 87 | 76 |
| Permanent compression set % | 1 | 1 | 6 | 1 | 5 |
| 100% modulus MPa | 0.7 | 1.0 | 0.8 | 0.9 | 0.6 |
| Friction coefficient | 1.71 | 1.49 | 1.56 | 1.73 | 1.51 |
| Abrasion after 2000 revolutions mg | 0.7 | 2.1 | 1.5 | 0.7 | 1.3 |
| Abrasion after 6000 revolutions mg | 1.1 | 3.6 | 2.8 | 1.0 | 2.5 |

Evaluation

The paper feed roll of Example 10, which has been subjected to secondary hardening for 24 hours, i.e., upper limit of the secondary hardening time of the present invention, falls within the preferred range of impact resilience, permanent compression set and 100% modulus and exhibits a high friction coefficient and an excellent abrasion resistance. On the other hand, the paper feed roll of Comparative Example 12, which has been subjected to secondary hardening at a temperature as high as 280° C., falls within the preferred range of permanent compression set and 100% modulus defined herein but deviates from the preferred range of impact resilience defined herein and exhibits poor friction coefficient and abrasion resistance. The paper feed roll of Comparative Example 13, which has been subjected to secondary hardening at a temperature as low as 120° C., and the paper feed roll of Comparative Example 14, which has been subjected to secondary hardening for a period of time as short as 0.25 hours, fall within the preferred range of 100% modulus defined herein but deviate from the preferred range of impact resilience and permanent compression set defined herein and exhibit poor friction coefficient and abrasion resistance.

In accordance with the foregoing constitution of the present invention, a paper feed roll adapted for office machines such as copying machine, facsimile and printer can be provided which exhibits a high friction coefficient suitable for the conveyance of copying paper, printing paper, original, etc. and less abrasion. A process for the preparation of such a paper feed roll can be provided. Further, a silicone rubber composition suitable for the foregoing paper feed roll having an excellent formability to roll can be provided.

While the invention has been described in detail and with reference to specific embodiments thereof, it will be apparent to one skilled in the art that various changes and modifications can be made therein without departing from the spirit and scope thereof.

What is claimed is:

1. A paper feed roll having a coating layer comprising a silica-containing silicone rubber having an impact resilience of not less than 80% as determined by JIS K6301, a permanent compression set of not more that 4% under a condition of 25% compression at 70° C. for 22 hours and a 100% modulus of from 0.3 to 1.0 MPa, wherein said silica-containing silicone rubber composition comprises:
(A) 100 parts by weight of diorganopolysiloxane gum consisting of
  (1) from 50 to 99 parts by weight of a diorganopolysiloxane gum having vinyl groups at both ends and at least one side chain vinyl group in an amount of from not less than 0.15 mol % to less than 0.8 mol % vinyl groups based on 100 mol % of all organic groups connected to silicon atoms and the plasticity of the gum is not less than 1.0 mm as determined by JIS C2123, and
  (2) from 1 to 50 parts by weight of a diorganopolysiloxane gum having vinyl groups at both ends and at least one side chain vinyl group in an amount of from 0.8 to 10 mol % vinyl groups based on 100 mol % of all organic groups connected to silicon atoms and the plasticity of the gum is not less than 1.0 mm as determined by JIS C2123;

wherein the vinyl group content based on 100 mol % of all organic groups connected to silicon atoms in the mixture of the foregoing components (1) and (2) is not less than 0.2 mol %;
(B) from 3 to 30 parts by weight of a reinforcing silica having a specific surface area of not less than 100 m²/g;
(C) from 0.1 to 10 parts by weight of a diorganosiloxane represented by the following general formula (I):

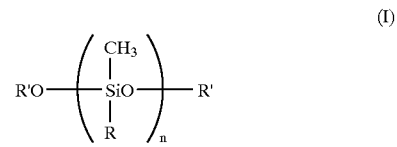

(I)

wherein R represents a substituted or unsubstituted monovalent hydrocarbon group, R' represents a hydrogen atom or $C_{1-8}$ alkyl group, and n represents an integer of from 1 to 50; and (D) a curing agent in an amount sufficient to cure said composition.

2. A process for the preparation of a paper feed roll comprising:

coating a roll core with a silica-containing silicone rubber composition which comprises diorganopolysiloxane gum having vinyl groups at both ends silica and diorganosiloxane represented by the following general formula (I) as a silica treating agent, said silica-containing silicone rubber composition exhibits an impact resilience of not less than 80% as determined by JIS K6301, a permanent compression set of not more than 4% under a condition of 25% compression at 70° C. for 22 hours and a 100% modulus of from 0.3 to 1.0 MPa;

subjecting the roll to primary curing at a forming temperature of from 150° C. to about 200° C. for about 2 to 15 minutes; and subjecting the roll to secondary curing at a forming temperature of from 150° C. to 250° C. for about 0.5 to 24 hours:

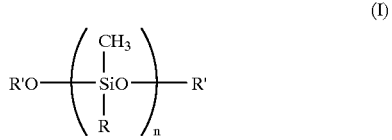

(I)

wherein R represents a substituted or unsubstituted monovalent hydrocarbon group; R' represents a hydrogen atom or $C_{1-8}$ alkyl group; and n represents an integer of from 1 to 50, wherein said silica-containing silicone rubber composition comprises:

(A) 100 parts by weight of diorganopolysiloxane gum consisting of
  (1) from 50 to 99 parts by weight of a diorganopolysiloxane gum having vinyl groups at both ends and at least one side chain vinyl group in an amount of from not less than 0.15 mol % to less than 0.8 mol % vinyl groups based on 100 mol % of all organic groups connected to silicon atoms and the plasticity of the gum is not less than 1.0 mm as determined by JIS C2123, and
  (2) from 1 to 50 parts by weight of a diorganopolysiloxane gum having vinyl groups at both ends and at least one side chain vinyl group in an amount of from 0.8 to 10 mol % vinyl groups based on 100 mol % of all organic groups connected to silicon atoms and the plasticity of the gum is not less than 1.0 mm as determined by JIS C2123;

wherein the vinyl group content based on 100 mol % of all organic groups in the mixture of the foregoing components (1) and (2) is not less than 0.2 mol %;

(B) from 3 to 30 parts by weight of a reinforcing silica having a specific surface area of not less than 100 m²/g;

(C) from 0.1 to 10 parts by weight of said diorganosiloxane; and (D) a hardener in an amount high enough to harden said composition.

3. A silica-containing silicone rubber composition for a paper feed roll comprising:

(A) 100 parts by weight of diorganopolysiloxane gum consisting of
  (1) from 50 to 99 parts by weight of a diorganopolysiloxane gum having vinyl groups at both ends and at least one side chain vinyl group in an amount of from not less than 0.15 mol % to less than 0.8 mol % vinyl groups based on 100 mol % of all organic groups connected to silicon atoms and the plasticity of the gum is not less than 1.0 mm as determined by JIS C2123, and
  (2) from 1 to 50 parts by weight of a diorganopolysiloxane gum having vinyl groups at both ends and at least one side chain vinyl group in an amount of from 0.8 to 10 mol % vinyl groups based on 100 mol % of all organic groups connected to silicon atoms and the plasticity of the gum is not less than 1.0 mm as determined by JIS C2123;

wherein the vinyl group content based on 100 mol % of all organic groups in the mixture of the foregoing components (1) and (2) is not less than 0.2 mol %;

(B) from 3 to 30 parts by weight of a reinforcing silica having a specific surface area of not less than 100 m²/g;

(C) from 0.1 to 10 parts by weight of a diorganosiloxane represented by the following general formula (I):

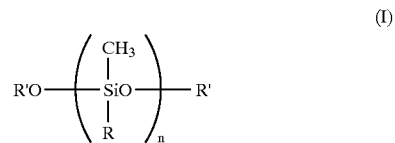

(I)

wherein R represents a substituted or unsubstituted monovalent hydrocarbon group, R' represents a hydrogen atom or $C_{1-8}$ alkyl group, and n represents an integer of from 1 to 50;

(D) a curing agent in an amount sufficient to cure said composition; and wherein said silica-containing silicone rubber has an impact resilience of not less than 80% as determined by JIS K6301, a permanent compression set of not more that 4% under a condition of 25% compression at 70° C. for 22 hours and a 100% modulus of from 0.3 to 1.0 MPa.

* * * * *